United States Patent [19]
Berglund

[11] Patent Number: 5,698,065
[45] Date of Patent: Dec. 16, 1997

[54] APPARATUS FOR MANUFACTURING GLASS-FIBRE-REINFORCED PLASTIC CONTAINER

[75] Inventor: Kurt Berglund, Norrfjärden, Sweden

[73] Assignee: Composite Scandinavia AB, Pitea, Sweden

[21] Appl. No.: 700,071

[22] Filed: Aug. 20, 1996

Related U.S. Application Data

[62] Division of Ser. No. 432,550, May 19, 1995, Pat. No. 5,595,321, which is a division of Ser. No. 352,282, Dec. 8, 1994, Pat. No. 5,547,533, which is a division of Ser. No. 142,476, filed as PCT/SE92/00347, May 20, 1992, abandoned.

[30] Foreign Application Priority Data

May 24, 1991 [SE] Sweden .................. 9101584

[51] Int. Cl.$^6$ .................................................. B65H 81/00
[52] U.S. Cl. ..................................... 156/425; 249/178
[58] Field of Search ........................... 156/169, 172, 156/175, 425; 249/155, 178, 150, 152

[56] References Cited

U.S. PATENT DOCUMENTS

| | | |
|---|---|---|
| 1,055,915 | 3/1913 | James . |
| 1,084,116 | 1/1914 | Slick et al. . |
| 2,343,106 | 2/1944 | Carney . |
| 2,594,693 | 4/1952 | Smith . |
| 3,036,728 | 5/1962 | Gibb . |
| 3,112,234 | 11/1963 | Krupp . |
| 3,282,757 | 11/1966 | Brussee . |
| 3,388,932 | 6/1968 | Bradley . |
| 3,412,891 | 11/1968 | Bastone et al. . |
| 3,492,186 | 1/1970 | Young . |
| 3,661,294 | 5/1972 | Pearson et al. . |
| 3,885,071 | 5/1975 | Blad et al. . |
| 4,004,706 | 1/1977 | Guldentels et al. . |
| 4,289,564 | 9/1981 | Hanaford et al. ................ 156/425 |
| 4,395,029 | 7/1983 | Davis et al. ................ 156/425 X |
| 4,594,122 | 6/1986 | McConnell . |
| 4,631,101 | 12/1986 | Rix ................................ 156/425 X |
| 4,750,960 | 6/1988 | Bubeck . |
| 4,765,458 | 8/1988 | Flanigen . |
| 5,062,914 | 11/1991 | Fuchs et al. ................ 156/169 X |
| 5,167,742 | 12/1992 | Peters . |
| 5,204,033 | 4/1993 | Brussee . |
| 5,211,306 | 5/1993 | Delonge-Immik et al. . |

FOREIGN PATENT DOCUMENTS

| | | |
|---|---|---|
| 0 270 411 | 6/1988 | European Pat. Off. . |
| WO 91/18239 | 11/1991 | WIPO . |

*Primary Examiner*—Jeff H. Aftergut
*Attorney, Agent, or Firm*—Pennie & Edmonds LLP

[57] ABSTRACT

Glass-fibre reinforced plastic tank, for example for liquid petroleum gas under high pressure, compressed air for air brakes or for storage of acetylene. The tank is composed of two halves, the open ends of which are conically bevelled to form a male end and a female end, which are joined to each other by an adhesive. The reinforcement in the outer and inner layers of the halves contains essentially longitudinal glass-fibre strands and the intermediate layer contains essentially longitudinal glass-fibre strands and the intermediate layer contains essentially transverse glass-fibre strands. In the half with the male end, the longitudinal glass-fibre strands in the inner layer are densely located adjacent to each other, while the longitudinal glass-fibre strands in the outer layer lie in separate groups of densely arranged glass-fibre strands with the predetermined spacing between the groups of form channel-shaped spaces. In the half with the female end, the order is reverse. In order to store acetylene, a pre-fabricated absorbent body of porous material is enclosed in the tank when the tank halves are glued together.

1 Claim, 4 Drawing Sheets

APPARATUS FOR MANUFACTURING GLASS-FIBRE-REINFORCED PLASTIC CONTAINER

This application is a divisional application of Ser. No. 08/432,550, filed May 1, 1995, now U.S. Pat. No. 5,595,321, which is in turn a divisional application of Ser. No. 08/352,282 filed Dec. 8, 1994, now U.S. Pat. No. 5,547,533, which in turn, is a divisional application of Ser. No. 08/142,476, filed as PCT/se92/00347, May 22, 1992, now abandoned.

The present invention relates to a glass fibre reinforced plastic tank for liquified petroleum gas, compressed air or acetylene gas, a method of manufacturing such tanks and an apparatus for manufacturing such tanks. Other reinforcing strands than glass fibre strands can also be used.

Swedish patent application 9001841-7 describes a glass fibre reinforced tank of the type in question which has in the conical joint between the two container halves, a special arrangement of the joint surfaces to enable the tank to withstand relatively high pressures, up to about 100 bar, for example.

The two tank halves in the known tank have outer, inner and intermediate layers, comprising densely laid fibre glass strands, which prior to casting of the tank form a separate reinforcing body which is laid in the mould. These glass fibre strands have, prior to manufacture of the reinforcing body, been included in strip-shaped collections of glass fibres or roving.

During casting, however, the densely laid reinforcing strands provide relative large flow resistance to the plastic and thus require a relatively high pressure for injection into the mould. It is of course desirable to be able to fill the mould with as many glass fibre strands as possible in order to obtain the corresponding high strength in the tank, but up to now it has not been possible to achieve a greater degree of filling than about 30% by weight glass fibre strands. The injection pressure is limited by the fact that if the pressure is too high, the reinforcing body will be axially compressed.

One purpose of the present invention is therefore to provide a glass fibre reinforced tank with a substantially increased amount of glass fibre strands than 30% by weight in the reinforcing body.

This is achieved with a tank which, according to the invention, has the characterizing features disclosed herein. The tank is manufactured with channel forming spaces between the groups of glass fibre strands in the outer layer of the male part and in the inner layer of the female part. These channels form during casting flow channels for the plastic material, so that it can be spread readily out from the channels and thus facilitate dispersion of the plastic material to the various portions of the reinforcing body. No appreciable increase in pressure is necessary to inject the plastic into the mould, while increasing the amount of glass fibre without any problems to about 60% by weight, which provides a corresponding increase in the strength of the tank. With the small cone angle in question for the conical bevel portions of the ends of the tank halves, i.e. 2–10°, there will be a correspondingly long overlap of the densely and thickly laid glass fibres in the outer layer of the female part and in the inner layer of the male part, while retaining the strength of the joint. As a whole, the tank will be somewhat weakened by the channel spaces in the outer layer of the male portion and in the inner layer of the female portion, but this weakening is marginal relative to the appreciably increased strength due to the possibility of increased filling with glass fibres.

However, the invention also is intended to make it possible to use the tank for acetylene gas. Previously known tanks have consisted of two metal halves welded together. A porous paste has been pressed through the connection opening of the tank and thereafter been sintered by heating the tank. This method cannot of course be used for a plastic tank, since the filler paste pressed into the tank cannot be sintered by heating. Conventionally, a known acetylene tank or ackumulator is filled with a porous filler, also called "AGA paste", which according to a known recipe consists of charcoal, diatomaceous earth, asbestos and cement. The paste is introduced into the tank in a wet state, and the tank is then dried in a kiln. When the water vapour thus leaves the paste, it becomes particularly porous, the pores assuming about 80% of the entire volume of the tank. The tank is filled with acetone which is absorbed by the porous material. Acetone is a liquid which is capable of dissolving large amounts of acetylene and this dissolving capability increases with increased pressure, and thus it is possible in a solution gas tank to store acetylene in liquid state at reasonable pressure. When the gas is taken out of a filled solution gas tank, the liquid level drops and there will be a free gas volume in the upper portion of the vertically standing tank. If there should be cause for an explosion in this gas quantity, it will however be prevented by the porous material, since an explosion cannot be propagated in the very small channels contained in this material. The material fills essentially the entire volume of the tank but shrinks somewhat during drying or sintering, and therefore it cannot completely fill the tank, and this is a disadvantage in view of the risk of explosion. Since the water vapour during drying can only escape through the tank opening, this drying operation takes quite a long time. A drying period of a week or more is not uncommon. The manufacture of acetylene tanks according to known technology is thus quite complicated, time-consuming and thus costly.

An additional purpose of the invention is therefore to provide a plastic tank, containing a sintered porous filler body, which can then absorb acetone and acetylene gas.

This is achieved by a tank as disclosed herein. The solution of the problem in question is thus extremely simple according to the invention, since it presents no particular difficulty to prefabricate a sintered filler body which fits exactly into the halves of the plastic tank as they are assembled.

By suitable adapting the moulds for the plastic halves, a filler body with exactly calculated outer dimensions can be prefabricated. The body can then be inserted with perfect fit into the two tank halves, which are then glued together to form a finished tank. The mould for the filler body can be made separably or provided with evacuation channels, so that the filler body for drying in a heat chamber can be removed in its entirety from the mould.

Alternatively, water vapour from the filler body paste can be diverted through specially designed evacuation chambers. Thus the remaining moisture can be purged in the form of steam at a fraction of the time required by the conventional method. The total outer surface of the filler body can be exposed, for example, to a stream of hot air or be further treated in the heat chamber after the filler body has been removed from the form.

One precondition for being able to manufacture the filler body separately and being able to insert it in its finished state into the plastic tank is that the tank be made in two halves according to the invention, which fit exactly over the filler body and thus can be joined, in closing the filler body, and then be glued together. If the tank should be made in a conventional manner in metal, it would be necessary to weld the two halves together. Welding involves, however, very high temperatures at the weld, thus damaging the portion of the filler body located adjacent the weld, thus creating cavities which could increase the risk of explosion. By enclosing the filler or absorption body in a plastic tank consisting of two fibre reinforced halves, the joining of the halves can be carried out at room temperature or slightly thereabove (about 50° C.) by glueing without affecting the degree of filling of the filler body in the tank.

Since the filler body shrinks somewhat during drying and sintering, it is advisable to start with the shape of the finished filler body and make the mould for the halves of the plastic tank from the shape of the filler body, thus assuring exact fit of the filler body in the inside of the plastic tank.

An additional purpose of the invention is to provide a method for manufacturing the reinforcing bodies included in the tank halves and a simple apparatus for carrying out the method. This is achieved by a method and an apparatus according to the invention which have the characterizing features disclosed herein.

Suitable embodiments of the tank according to the invention are shown as examples in the accompanying schematic drawings, and will be elucidated below in the following description. Also described below is a method according to the invention of manufacturing the tank and one embodiment of an apparatus for manufacturing the reinforcing glass fibre bodies included in the tank.

Figure 1:
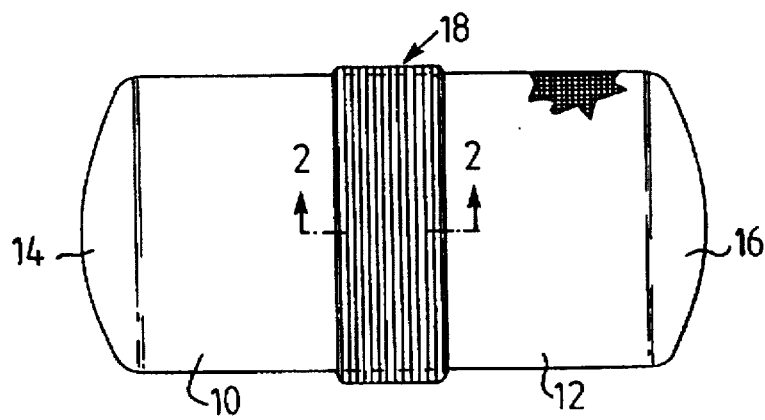
FIG. 1 is a side view of the container consisting of two cylindrical halves. Each half is made in one piece and has a bottom.
Figure 2:
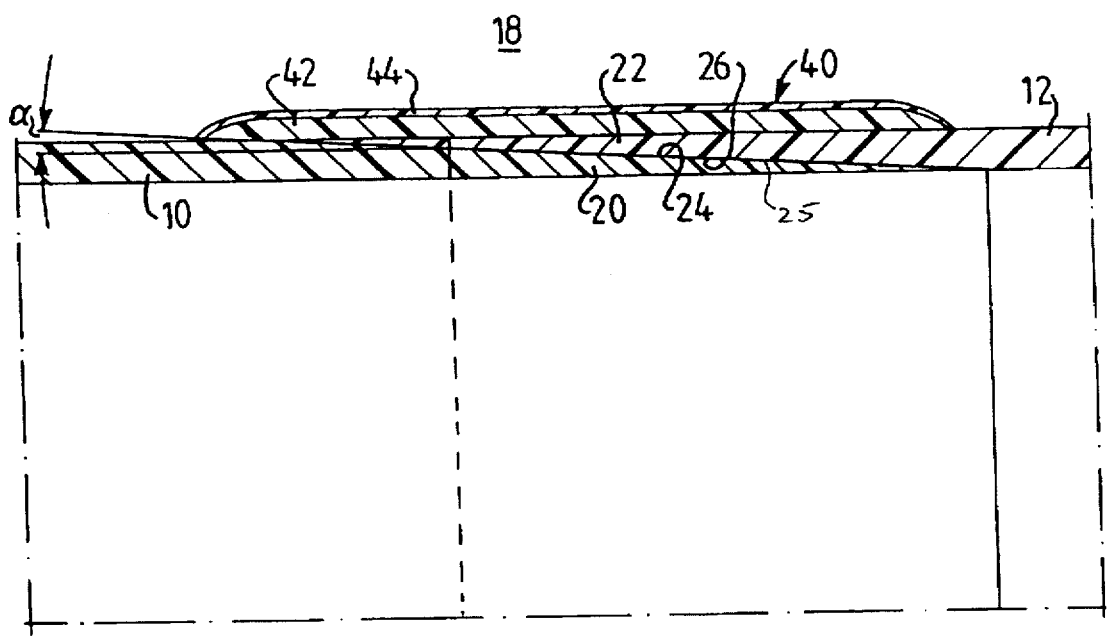
FIG. 2 shows in a larger scale a section along the line 2—2 in FIG. 1, leaving out the fibre-glass reinforcement.

The tank in FIG. 1 is composed of two cylindrical halves 10, 12, each of which has a bottom 14, 16, respectively.

In the joint between the two halves, the end portion 20, which is a male portion, is inserted into the end portion 22 so that the internal glueing surface 26 of the end portion 22 will lie precisely against the external glueing surface of the end portion 20 to thereby achieve effective adhesion therebetween to form a glueing joint which provides an air-tight seal against the gas under pressure in the tank, said pressure being in the range of 2–60 bars. The glue joint 25 can also absorb substantial tensile and shearing stresses.

In order to increase the resistance of the joint to external stresses, e.g. in the form of blows, bumbs or heating, the joint is provided with a protective sleeve 40, which consists of glass-fibres which have been wound in the form of a glass-fibre roving about the joint and provide together with a suitable UV-curing plastic an insulating protecting sleeve. According to a preferred embodiment, the protective sleeve comprises an inner layer 42 of polyurethane foam, with a suitable thickness of 2 mm and a thin outer cover layer 44 of glass-fibre reinforced plastic and with a thickness of about 1 mm.

Figure 3:
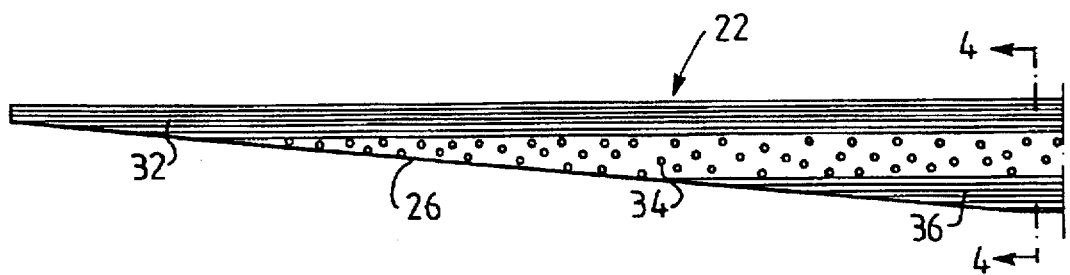
FIG. 3 is a schematic representation in longitudinal section of the end portion included in the joint of the female part in FIG. 2.
Figure 4:
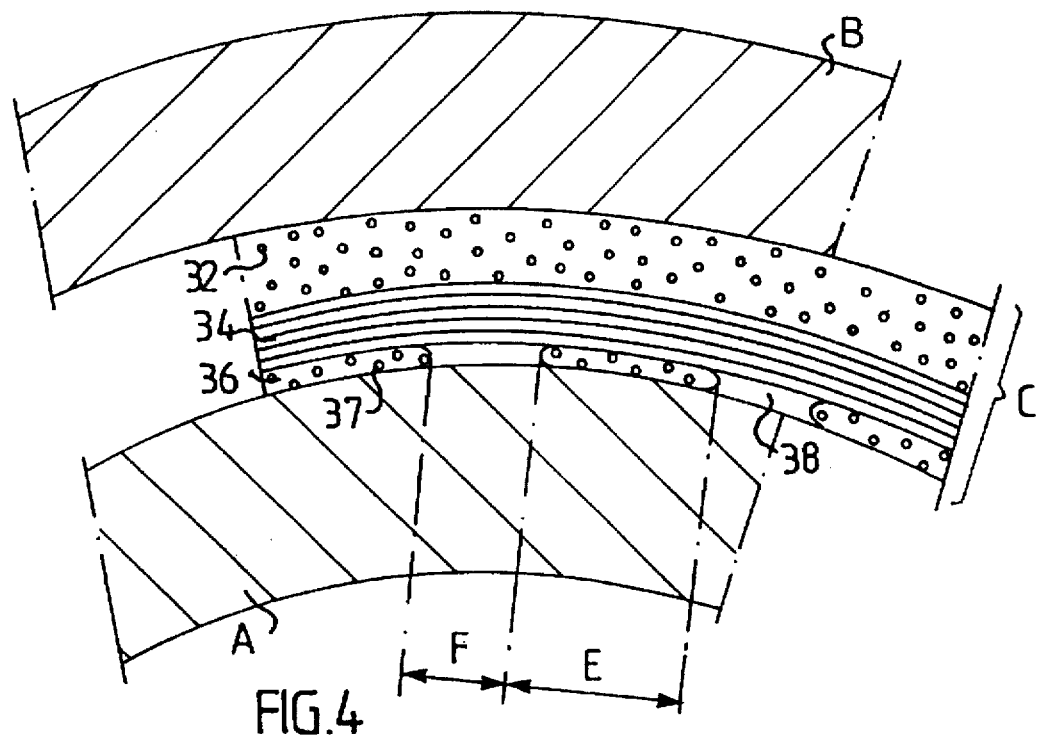
FIG. 4 is a schematic representation of the strand orientation in cross-section along the line 4—4 in FIG. 3, showing the reinforcing body laid between the inner and outer portions of the mould.

FIGS. 3 and 4 show the orientation and placement of the reinforcing strands in the end portion 22 of the female part according to the invention. FIG. 3 shows the end portion in longitudinal section while FIG. 4 shows the same part in cross-section. The conical joint surface 26 cuts through three different reinforcing layers of plastic and reinforcing strands. According to the invention, an outer layer 32 and an inner layer 36 are each composed of longitudinal reinforcing strands, while the intermediate layer 34 is composed of a number of courses of transverse reinforcing strands. The outer layer 32 extends out to the thinnest portion of the end portion 22. The inner layer 36 terminates, however, in the joint surface at the thick portion of the end portion 22. The longitudinal reinforcing strands in the outer layer are densely packed in a number of courses, while the longitudinal strands in the inner layer 36 are laid in flat groups of densely arranged reinforcing strands with a predetermined space between the groups. This provides channel spaces 38 between the groups 37 of densely arranged reinforcing strands or roving.

The groups 37 form flat collections of glass-fibres. The width of the channels F between the groups is suitably at least half of the width E of each group.

Figure 5:
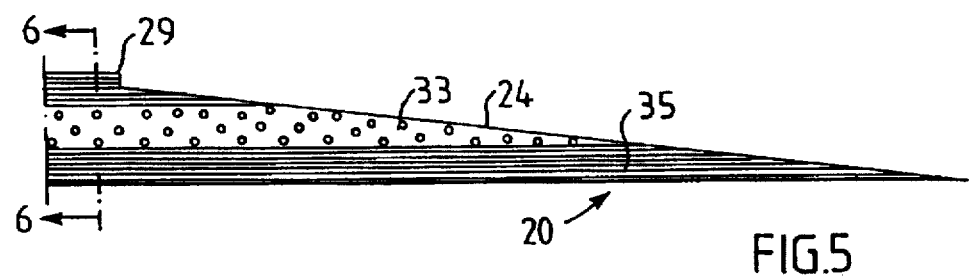
FIG. 5 is a schematic representation of the strand orientation in longitudinal section of the end portion of the male part.
Figure 6:
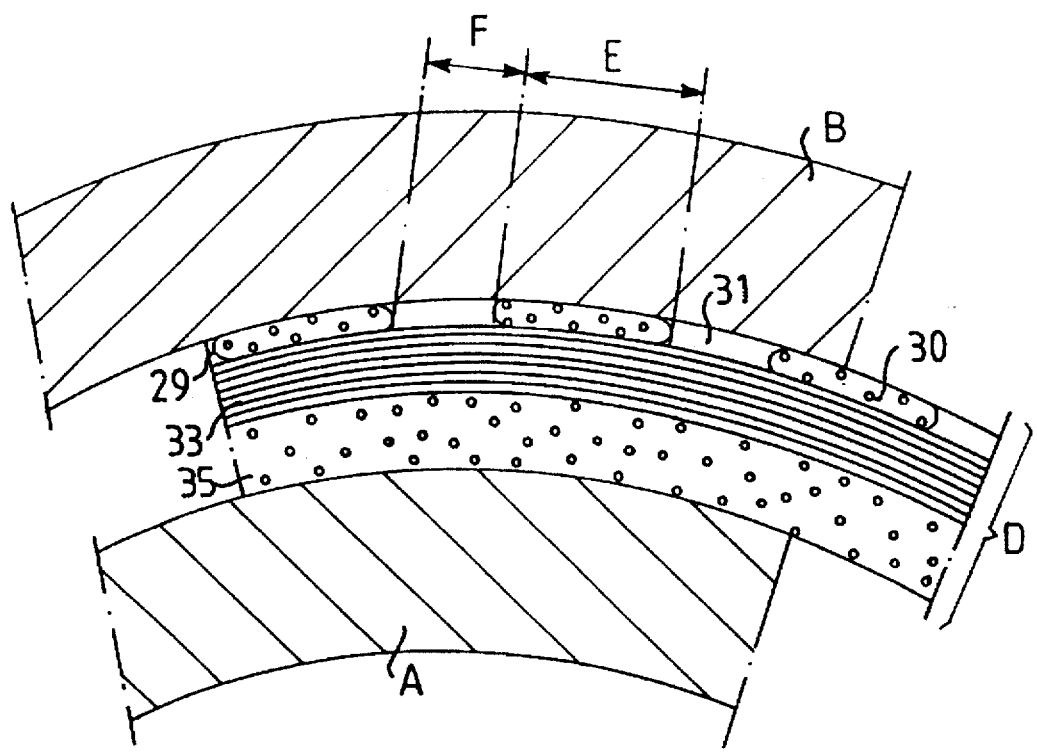
FIG. 6 is a schematic representation of the strand orientation in cross-section along the line 6—6 in FIG. 5 and shows the reinforcing body laid between the outer and inner portions of the mould for casting the tank half shown in FIG. 5.

FIGS. 5 and 6 show the orientation and placement of the reinforcing strands in the end portion 20 of the male part according to the invention. FIG. 5 sows the end portion in longitudinal section, while FIG. 6 shows the same portion in cross-section. The conical joint surface cuts through three different layers of glass-fibre strands, which are enclosed in plastic material. An outer layer 29 and an inner layer 35 are each composed of longitudinal reinforcing strands, while an intermediate layer 33 is composed of a number of courses of transverse reinforcing strands. The outer layer 29 ends at the joint surface in a thicker portion of the end portion 20. The inner layer 35 extends, however, out to the thinnest section of the end portion 20. The longitudinal reinforcing strands in the inner layer 35 lie densely packed in a number of courses while the longitudinal threads in the outer layer 29 form groups 30 of densely arranged reinforcing strands with a predetermined spacing between the groups. This provides channeled spaces 31 between the spaced groups 30 of densely packed reinforcing strands. In this case as well the spacing between the groups is at least equal to half of the width of each group.

FIGS. 4 and 6 indicate how the inner and outer mould walls A and B, respectively, were disposed in the mould, into which the glass-fibre strand reinforcing body C and D, respectively, were placed before plastic was injected into the mould. Plastic injected into the bottom end of the mould flows through the channels 31 and 38, respectively, at relatively high pressure to initially fill out the spaces between the strands in the inner layer 36 in FIG. 4 and the outer layer 29 in FIG. 6. From there the plastic flows from the channels essentially radially in between the transverse glass-fibre strands in the intermediate layers 34, 33 and continues radially between the longitudinal fibre strands in the layers 32, 35.

Thanks to the channels 38, 31 the plastic will, due to its radial flow from the channels, have a shorter path for spreading out into the reinforcing body, which in turn means that there will be less resistance in comparison to previously known reinforcing bodies, which have a fibre percentage of about 30% by weight. The pressure could thus be reduced while still retaining the same dispersion of plastic. If one wishes, however, to retain the pressure at a relatively high level, this can be utilized to overcome the resistance of the greater percentage of fibres in the reinforcing body according to the invention. Tests performed have shown that it is possible without difficulty to increase the percentage of fibres to about 60% by weight.

Figure 7:
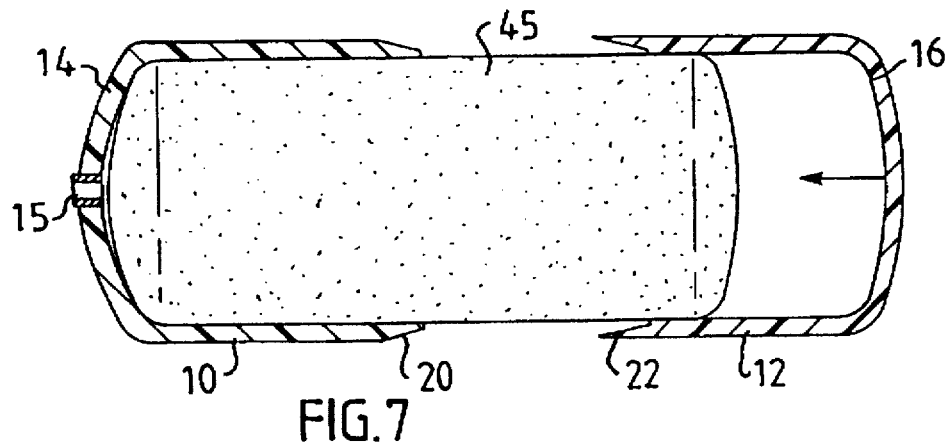
FIG. 7 shows a finished filler or absorbent body of porous material designed to fit into the finished plastic tank. The absorbent body is completely inserted into one tank half and only partially into the other tank half.
Figure 8:
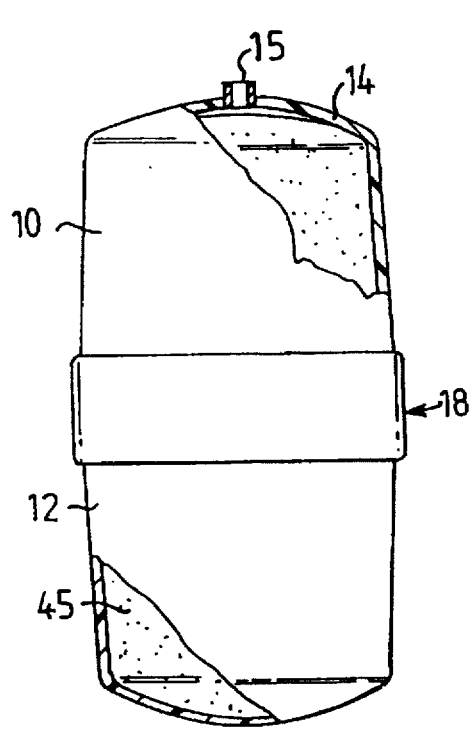
FIG. 8 shows an alternative embodiment of the tank halves and the filler body.
Figure 9:
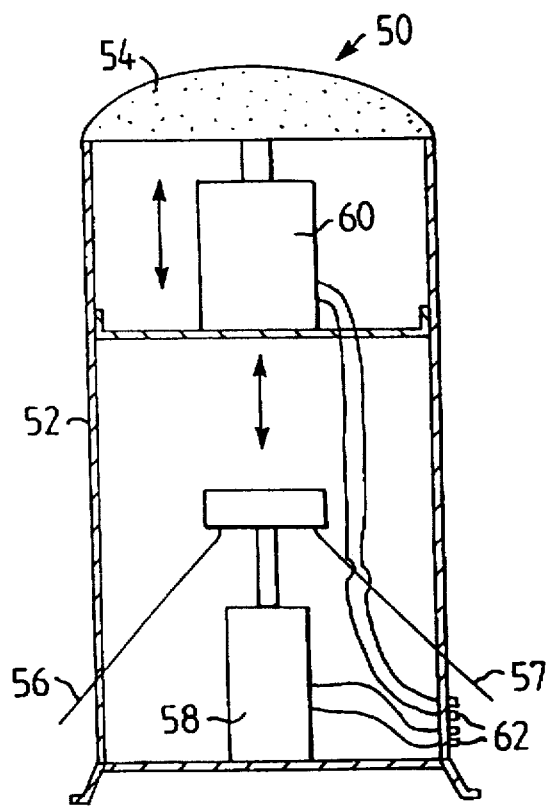
FIG. 9 shows schematically in section a moulding tool for producing the reinforcing bodies of glass-fibre strands for the tank.

FIG. 7 shows the filler body 45 with tank half 10 completely in place and tank half 12 partially slipped into place. The external dimensions of the body 45 agree precisely with the inner dimensions of the respective tank halves, and this means that each tank half can be slipped tightly under the cylindrical lateral surface of the body 45 as shown by the arrow, until the conical joint surfaces of the end portions 20 and 22 make contact for glueing. The tank is provided with an opening 15 for filling and dispensing a fluid. The filler body 45 thus completely fills out the entire volume of the tank except for the area around the opening where a small gap or slit a has been left about the opening to increase the evaporation surface for acetylene when the tank is in its vertical position for use, as shown in FIG. 8. The gap is about 2 mm about the opening an decreases radially outwards. The gap can be partially filled with radial ribs on the inside of the tank or on the end of the filler body in order to take up any axial forces when the tank is subjected to impact, i.e. when the vertical tank is dropped from a certain height.

FIG. 8 shows a tank according to the invention equipped with a filler body or absorbent body 45 made of a porous material which is known per se and which is intended to contain acetylene dissolved in acetone in a known manner.

In the preferred embodiment of the filler body according to FIG. 8, the filler body 45 has the shape of two truncated cones pointed away from each other with a common base surface and a cone angle in the range of 1°–7°. Each tank half 10 and 12, respectively, has an internal shape agreeing with the respective cone so that the filler body 45 in this case as well fills out the entire volume of the tank without any gaps or spaces being formed in the boundary between the wall of the tank and the filler body, except in the area about the opening 15. The conical shape makes it easier to achieve exact fit when assembling the tank and the enclosed filler body. A certain amount of elasticity prevents the filler body from shrinking after a period of use and giving rise to undesirable gaps.

The male part 10 and the female part 12 are manufactured by a method according to the invention. According to this method, first several layers of longitudinal and transverse glass-fibre strands are built up on a core with the aid of a robot, thus forming a reinforcing body of glass-fibre strands. The glass-fibre strands building the reinforcing body are fixed in a known manner relative to each other by spraying on a resin powder slurried with water, whereafter heating takes place in a known manner to bind the glass-fibre strands to each other to achieve a finished reinforcing body. This body is placed in a mould which is sealed and molten plastic is then pressed through the mould gate. The mould is then heated to 50° C., whereupon the plastic sets and the tank half is removed from the mould.

The reinforcing body for the male part 10 has a male end 20 and is manufactured by winding on a core 50, the preforming tool, at least one layer of longitudinal reinforcing strands densely arranged. A robot first fixes a roving of reinforcing strands on hooking means 56 located near the lower portion of the form. Said roving is drawn up along a path 52 on the form until it is in level with the upper closed end thereof, whereupon the fibre roving is drawn diametrically across said end and then downwards along a diametrically opposed path on the form to be hooked on second hooking means 57, which are opposed to the first hooking means and are also located near the lower portion of the form.

One then continues to lay the fibre rovings closely adjacent to the preceding course and hook the fibre rovings on additional hooking means (not shown), repeating the sequence a predetermined number of times until a predetermined density between the rovings is achieved and the layer of a predetermined number of roving courses is achieved. A layer of transverse densely arranged bundles of fibres is then would on the layer of longitudinal fibres, said layer being wound with a number of courses on each other depending on the required stress tolerance of the finished tank. On top of this layer of transverse fibres, there is finally wound with the same procedure as in the previously wound inner layer an outer layer of longitudinal fibre rovings, which are collected in groups of densely arranged fibre rovings with a predetermined space between the groups so that channel-shaped spaces are formed between them. The female part 12 with the end 22 is made in a corresponding manner but in the reversed order, i.e. the layer with channel forming longitudinal groups of fibre rovings is wound first, and thereafter the transverse layer and finally the layer with longitudinal reinforcing strands, wound closely to each other in a number of courses.

By making the reinforcing body of the male part and the female part as described above, there is obtained after casting and curing a male part, the reinforcement of which for absorbing axial forces is located essentially in the layer closest to the interior, and a female part, the reinforcement of which for absorbing axial forces is located essentially in the layer closest to the exterior. The cast male and female parts are then finished by cutting off the protruding glass-fibre reinforcing strands from the open ends, whereafter the end portion 20 of the male part is conically bevelled with a cone angle α and the end portion 22 of the female part is bevelled to a corresponding inner cone angle α. The two halves can now be joined together to form a tank by applying adhesive to the joint surfaces 24, 26, which due to the simple bevelling can be easily moved into contact with each other.

The joint is then provided with the heat insulating and impact protecting sleeve 40 comprising polyurethane foam, which, for example in the form of a 2 mm thick strip 42 has been wound around the joint. The strip 42 is then covered by a covering layer 44 of fibre reinforced plastic when can consist of reinforcing strands, such as glass-fibre strands, wound about the joint together with a suitable UV-curing plastic to provide the stiff covering layer 44.

The apparatus for manufacturing the reinforcing bodies included in the tank comprises a winding robot (not shown) with feeder nozzles for feeding glass-fibre rovings, a preshaping form 50, a spray head for spraying meltable resin powder slurried in water and a heat chamber (not shown) for heat treating a finished reinforcing body. The preshaping form 50 has a vertical cylinder 52 on the upper angular end of which a bowl-shaped cap 54 rests. The cap is connected to a pneumatic cylinder 60, thus making it possible to raise and lower the cap 54 in the direction of the double arrow to facilitate removal of a finished reinforcing body. At the bottom of the form there is an additional pneumatic cylinder 58 for retracting or extending through openings in the wall of the form, hingedly fixed hooking means 56, 57, e.g. steel wires such as bicycle spokes. The fixing points of the hooking means can thus be raised or lowered in the directions of the smaller double arrow. Each cylinder is operated via pressure lines connected to corresponding pneumatic connections 62.

When a reinforcing body is to be wound, the piston rods of the two pneumatic cylinders 58, 60 are retracted. Thus the cap 54 will rest on the upper angular end of the cylinder 52 and form together with the cylinder a core for winding a reinforcing body for a male part or a female part. The ends of the hooking means 56, 57 hinged to the piston rod of the cylinder 58 are thus in their lowermost position. In this position, the ends of the means extend a predetermined distance outside the lower cylindrical wall portion of the form 50. The fibre rovings to be wound into a reinforcing body are hooked onto the hooking means and are drawn up and over the core as described previously. After the reinforcing body has been wound and fixed by spraying resin powder slurried in water followed by heat setting, the finished reinforcing body is to be removed from the form. Compressed air is therefore sent to the pressure side of the cylinder 58 to press the piston rod out and the ends of the hooking means 56, 57 hinged to the piston rod will assume their uttermost position and the protruding ends of the means will be pulled in through the openings in the cylindrical wall of the form 50. By directing compressed air to the connection 62 which is joined to the cylinder 60, the piston rod is pressed out lifting the cap 54 from the upper edge of the cylinder. The finished reinforcing body is thus lifted up by the cap 54 so that it is displaced a corresponding distance and can be lifted off the form 50 with the aid of a conventional gripping means and be placed in storage or be further treated directly by trimming the end and grinding the respective conical joint surface for subsequent placement in the casting mould for casting a tank half.

I claim:

1. Apparatus for producing a reinforcing body of fibre strands for insertion in a mould for casting a fibre-reinforced cylinder with one end closed, comprising a winding robot with feeder nozzles for feeding fibre rovings, a pre-shaping form on which a male part or a female part is pre-shaped, a plastic sprayer for spraying thermo-setting resin powder and a heat chamber for setting a finished pre-shaped part, characterized in that the pre-shaping form (50) has a core comprising a vertical cylinder (52) having a lower portion and an upper annular end; a bowl-shaped cap (54) positioned on said upper annular end for vertical movement; a retractable and extendable hooking means (56, 57) positioned adjacent the lower portion of said cylinder; said hooking means being arranged along the circumference of the cylinder for vertical movement along said cylinder; a pneumatic cylinder (58) hinged to said hooking means for effecting said movement of said hooking means; and a pneumatic cylinder (60) connected to said cap (54) for effecting said vertical movement of said cap.

* * * * *